(12) United States Patent (10) Patent No.: US 8,165,580 B1
Kawasaki (45) Date of Patent: Apr. 24, 2012

(54) CELL SELECTING APPARATUS AND CELL SELECTING METHOD

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1385 days.

(21) Appl. No.: 11/797,981

(22) Filed: May 9, 2007

Related U.S. Application Data

(63) Continuation of application No. PCT/JP2004/016682, filed on Nov. 10, 2004.

(51) Int. Cl.
*H04W 4/00* (2009.01)
*H04W 36/00* (2009.01)
*H04W 40/00* (2009.01)
*H04B 1/00* (2006.01)

(52) U.S. Cl. .............. 455/432.3; 455/435.2; 455/436; 455/443; 455/448; 375/144; 375/148

(58) Field of Classification Search .............. 455/432.3, 455/435.2, 435.3, 436, 437, 438, 439, 443, 455/448; 375/144, 147, 148, 150
See application file for complete search history.

(56) References Cited

U.S. PATENT DOCUMENTS

| | | | |
|---|---|---|---|
| 5,892,879 A | 4/1999 | Oshima | |
| 6,993,083 B1 * | 1/2006 | Shirakata et al. | 375/260 |
| 7,292,556 B2 * | 11/2007 | Matsumoto | 370/335 |
| 7,298,692 B2 * | 11/2007 | Hiramatsu et al. | 370/208 |
| 2003/0081538 A1 | 5/2003 | Walton | |
| 2004/0029579 A1 | 2/2004 | Kashiwase | |
| 2004/0258098 A1 | 12/2004 | Ohkubo | |

FOREIGN PATENT DOCUMENTS

| | | |
|---|---|---|
| EP | 1 298 948 | 4/2003 |
| EP | 1 467 585 | 10/2004 |
| JP | 2000-324083 A | 11/2000 |
| JP | 2002-345035 | 11/2002 |
| JP | 2004-072456 A | 3/2004 |
| JP | 2004-254304 A | 9/2004 |
| WO | 01/22765 | 3/2001 |

OTHER PUBLICATIONS

"3rd Generation Partnership Project; Technical Specification Group Radio Access Network; Feasibility Study for Orthogonal Frequency Division Multiplexing (OFDM) for UTRAN Enhancement (Release 6)," *3GPP TR 25.892*, V6.0.0 (2004-2006).
Nortel Networks, France Telecom; "Revised Text proposal for Sections 3 & 4 of TR 25.892"; 3GPP TSG-RAN1 #31, Tokyo, Japan, Feb. 18-21, 2003; R1-030169; [Ref.: European Search Report mailed Apr. 20, 2011].
European Patent Office, "Supplementary European Search Report" issued for corresponding European Patent Application No. 04799580.8, mailed Apr. 20, 2011.

* cited by examiner

*Primary Examiner* — Un C Cho
(74) *Attorney, Agent, or Firm* — Myers Wolin, LLC

(57) ABSTRACT

A cell selection apparatus is used in the environment in which multiple communication systems coexists and at least one of the communication systems use guard intervals inserted in the transmission signal. The apparatus includes delay profile creation means (722) for creating a delay profile from a received radio signal and detecting amplitudes and timing of multipath arriving waves; comparison means (728) for comparing at least one delay quantity of the multipath arriving waves with a guard interval of a signal used in at least one of said multiple communication systems; and determination means (730) for determining a cell provided by one of the communication systems to which a mobile terminal is to be connected based on the comparison result.

9 Claims, 18 Drawing Sheets

CELL SELECTING APPARATUS AND CELL SELECTING METHOD

CROSS-REFERENCE

This application is a U.S. Continuation application of a PCT International application No. PCT/JP2004/016682 filed on Nov. 10, 2004, and claims the benefit under 35 U.S.C. 120 and 365(c), the disclosure of the PCT International application being hereby incorporated by reference.

BACKGROUND OF THE INVENTION

1. Field of the Invention

The present invention relates to the technological field of wireless communication, and more particularly, to a cell selection technique for determining which cell of which wireless communication system is to be accessed by a mobile terminal in the multi-system coexisting environment.

2. Description of the Related Art

Currently available mobile communication systems constituted by multiple cells include second-generation cellular phone systems using time division multiple access (TDMA) schemes, personal handy-phone systems (PHS), and third-generation cellular phone systems using code division multiple access (CDMA) schemes. So far, single-carrier CDMA scheme has become the mainstream in the third-generation cellular phone systems. When using single-carrier CDMA, the transmission bandwidth has to be broader as the transmission rate is increased, and the system becomes more susceptible to frequency selective fading. In addition, the chip rate is increased (that is, the chip length become shorter) due to the speed-up. Although the multipath separating ability is improved, the amplitude of each received path becomes small, and the degradation in RAKE combining becomes serious. For these reasons, certain limitation exists in speed-up in ordinary single-carrier CDMA. For the fourth-generation mobile communication systems aiming at the downlink transmission rate of 100 Mbps or more during high-speed travel, it is deemed that orthogonal frequency division multiplexing (OFDM) is the most promising candidate, in place of ordinary single-carrier CDMA, to achieve a high transmission rate. At present, OFDM is in digital terrestrial broadcasting, IEEE 802.11 wireless LAN, and HiperLAN.

A typical radio access scheme currently employed in the third-generation cellular phone systems is code division multiple access (CDMA), and the mainstream technologies are WCDMA and cdma 2000. these technology trends and the market needs have to be taken into account when introducing OFDM. In the 3GPP for discussing and establishing the spec of the 3G system employing a WCDMA scheme, it is discussed to make use of upper layers of a WCDMA system to introduce an OFDM scheme in the physical layer and the wireless domain. The contents of technology concluded and agreed by the 3GPP as to the introduction of OFDM in 3G systems are described in 3GPP documents. See 3GPP TR 25.892, V6.0.0 (2004-06).

One reason for introducing OFDM schemes in the WCDMA-based 3G radio access system is that the OFDM has a superior transmission characteristic even in the multipath propagation environment. Another reason is that OFDM can achieve higher throughput, as compared with WCDMA, when transmitting signals in parallel to the conventional high-speed downlink packet access (HSDPA) signals transmitted with fixed specs. It is supposed that in the hypothetical system used in the 3GPP discussion, the facilities of wireless base stations are shared by the OFDM system and the WCDMA system. Accordingly, the upper layers including the MAC layer of the current WCDMA system are shared by both systems, while physical layers are used by these systems independently from each other. In addition, the radio sections (such as an RF unit and an antenna unit) are shared by the two systems. Because, in such a hypothetical system, WCDMA signals and OFDM signals are transmitted from the same antenna, WCDMA cells and OFDM cells coexist, which different cells are formed as concentric layers.

The future (the fourth-generation) mobile communication systems are likely to employ multi-carrier signal transmission schemes, such as OFCDM (which is also called MC-CDMA) in which code spreading techniques are introduced in OFDM or OFDM-based schemes. Accordingly, a third-generation system and a fourth-generation system are likely to coexist in the course of transition from the third-generation system to the fourth-generation system and even after the fourth-generation systems become common. It is also likely that mobile terminal devices connectable to the both systems come up during the transition. The third-generation systems may continuously exist for the purpose of voice communications or low-rate data transmission even after the fourth-generation systems become widespread. In the WCDMA/OFDM coexisting system discussed at the 3GPP, mobile terminals are connected to a network using a WCDMA radio link, and accordingly, it is presumed that a mobile terminal using an OFDM radio link can also use a WCDMA radio link (i.e., connectable to a WCDMA cell).

As has been described above, a third-generation cells and a certain type of fourth-generation cell are formed in a concentric manner. This means that an overlapping area connectable to the both cell exists. The mobile terminal located in such an area has to select either cell to carry out radio communications. An OFDM cell strong in multipath interference will be suitable for high-quality and high-speed signal transmission, as compared with a WCDMA cell, as long as signal delay resides within the guard interval.

For the purpose of improving the tolerance to multipath interference, guard interval is inserted in an OFDM radio signal. If the time delay of a delayed wave is within the guard interval, the characteristic degradation due to delayed waves can be reduced greatly to substantially the negligible extent. This means that even if time delay of delayed wave components contained in the received at a mobile terminal is large, interference can be avoided by setting the guard interval longer. As the cell radius increases, time delay of the delayed wave is likely to increase because the signal propagation range increases. Accordingly, it is necessary to elongate the guard interval inserted in an OFDM signal to be transmitted in the wireless section of the cell. However, inserting long guard interval in a transmission signal will decrease the transmission efficiency because the guard interval itself does not contribute to data transmission. For this reason, it is desired for an OFDM cell to select a smaller cell radius to prevent degradation of the transmission efficiency as much as possible, and it is also desired to set the guard interval of the OFDM transmission signal as short as possible. It is naturally expected in the WCDMA/IFDN coexisting system that the OFDM cell size is set smaller than the WCDMA cell size.

A technique for optimizing the length of the guard interval according to the communication status is disclosed in, for example, JP 2002-345035.

If, in a WCDMA-cell/OFDM-cell coexisting system, a mobile terminal is compatible and connectable to both types of cells, to which cell the mobile terminal is to be connected has to be appropriately determined. It is expected from the above-described speculation that an OFDM cell will have higher performances (including transmission characteristic and throughput) in many cases under the situation where both types of cells are available.

In general, a pilot signal is used in a mobile communication system (including a third-generation cellular system) to select a cell from among multiple cells. The pilot signal is transmitted from each cell and received at a mobile terminal. A reception characteristic (such as a received SNR) is measured by the mobile terminal, and cell selection is carried out based on the measurement result. The load distribution (including the number of currently connected mobile terminals and the traffic) may be taken into account. Applicability of this method to cell selection in a WCDMA/OFDM coexisting system in which a WCDMA cell and an OFDM cell coexist as concentric layers is described in detail below. In the following speculation, it is assumed that the radium of the OFDM cell is set smaller than that of the WCDMA cell, and that a mobile terminal is located in the OFDM cell. In comparison between the power levels of the WCDMA pilot signal and the OFDM pilot signal, it is expected that the former one shows better receiving characteristic than the latter one.

As illustrated in FIG. 1, in order to guarantee the same receiving power level ($P_{th}$) at the cell boarders, the WCDMA pilot signal has to be transmitted with greater power as compared with the OFDM pilot signal. It is expected accordingly that the receiving power level ($P_{CDMA}$) of the WCDMA pilot signal generally becomes higher than the receiving power level ($P_{OFDM}$) of the OFDM pilot signal when it is received at the mobile terminal located in the OFDM cell. As a result, the WCDMA cell is likely to be selected in spite of the fact that the mobile terminal is located in the OFDM cell with better signal transmission characteristic.

To overcome this inconvenience, it may be proposed to give an offset to the receiving power level of the pilot signals received at the mobile terminal to compensate for the difference in the receiving power levels of the two pilot signals. However, such correction to the receiving power levels is not easy. Even if such correction can be realized, it is still difficult to appropriately determine which cell is to be selected if the pilot signals from the both cells have the same received power levels.

This problem may occur not only in the WCDMA/OFDM coexisting system, but also in an arbitrary system in which different types of cells coexist.

SUMMARY OF THE INVENTION

The present invention was conceived in view of the above-described problem, and it is an object of the invention to provide a cell selection apparatus and a cell selection method that can appropriately select a cell for radio access from a mobile terminal, taking the communication conditions into account, when the mobile terminal is located in a multi-system coexisting area in which multiple systems coexist and at least one of the systems uses guard interval inserted in a transmission signal.

In the present invention, a cell selection apparatus is suitably used in an area in which multiple communication systems coexist. This apparatus comprises a detection unit configured to create a delay profile from a received radio signal and detect amplitudes and timings of multipath arriving waves, a comparison unit configured to compare a time delay of at least one of the arriving waves with the time length of the guard interval of a signal used in at least one of the systems, and a determination unit configured to determine to which cell a mobile terminal is to be connected based on the comparison result.

With the above-described structure, in the multi-system coexisting environment in which at least one of the communication systems uses guard interval inserted in a transmission signal, it is appropriately determined according to communication conditions as to which system is to be selected for radio access from the mobile terminal

BRIEF DESCRIPTION OF THE DRAWINGS

Other objects, features, and advantages of the present invention will become more apparent from the following detailed description when read in conjunction with the accompanying drawings, in which.

DETAIL DESCRIPTION OF THE PREFERRED EMBODIMENTS

The preferred embodiments of the present invention will now be described in detail with reference to the attached drawings. Prior to describing each of the embodiments, explanation is made of the outline of the invention.

In a preferred arrangement, a delay profile is created from a radio signal in an area in which multiple communications systems coexist, and the amplitudes and the timings of multipath arriving waves are detected. The quantity of delay of at least one of the arriving waves is compared with the guard interval inserted in a signal used in at least one of the communication systems, and it is determined which communication system is to be selected for radio access from a mobile terminal based on the comparison result. Because the delay quantity of the multipath arriving wave is compared with the guard interval, and because the cell is selected according to the comparison result, a cell to be accessed by a mobile terminal can be appropriately determined according to the communication conditions.

In one example, the quality of the received radio signal of each of the communication systems is measured. For example, the power level of the received signal is taken into account, in addition to the delay quantity, to select a cell for radio access from the mobile terminal.

The delay quantity of said at least one of the multipath delayed waves may be compared with two or more guard intervals used in two or more communication systems among the multiple systems. Even if all the communication systems to be considered in cell selection are using guard intervals, an appropriate cell can be selected.

In an example, a cell using a first guard interval encompasses the entire area of a cell using a second guard interval which is shorter than the first guard interval.

The cell selection apparatus may be provided in a mobile terminal, or alternatively, it may be provided in a wireless base station or an upper apparatus thereof. All or a part of the cell selection method may be carried out in the mobile terminal. Alternatively, all or a part of the cell selection method may be performed by the wireless base station or the upper apparatus.

The communication system using a guard interval in the transmission signal is, for example, an OFDM system or a CDMA system.

In a preferred example, a CDMA cell encompasses the entire area of a cell provided by another communication system using a guard interval in the transmission signal.

In a preferred example, at least one of the communication systems is a CDMA system.

In a preferred example, cell selection is performed among three or more cells.

The term "OFDM" used in the specification and the claims should be broadly interpreted, and it covers not only a system in which signal is not subjected to code spreading, but also a system (such as MC-CDMA) using code spreading.

Embodiment 1

Figure 1:
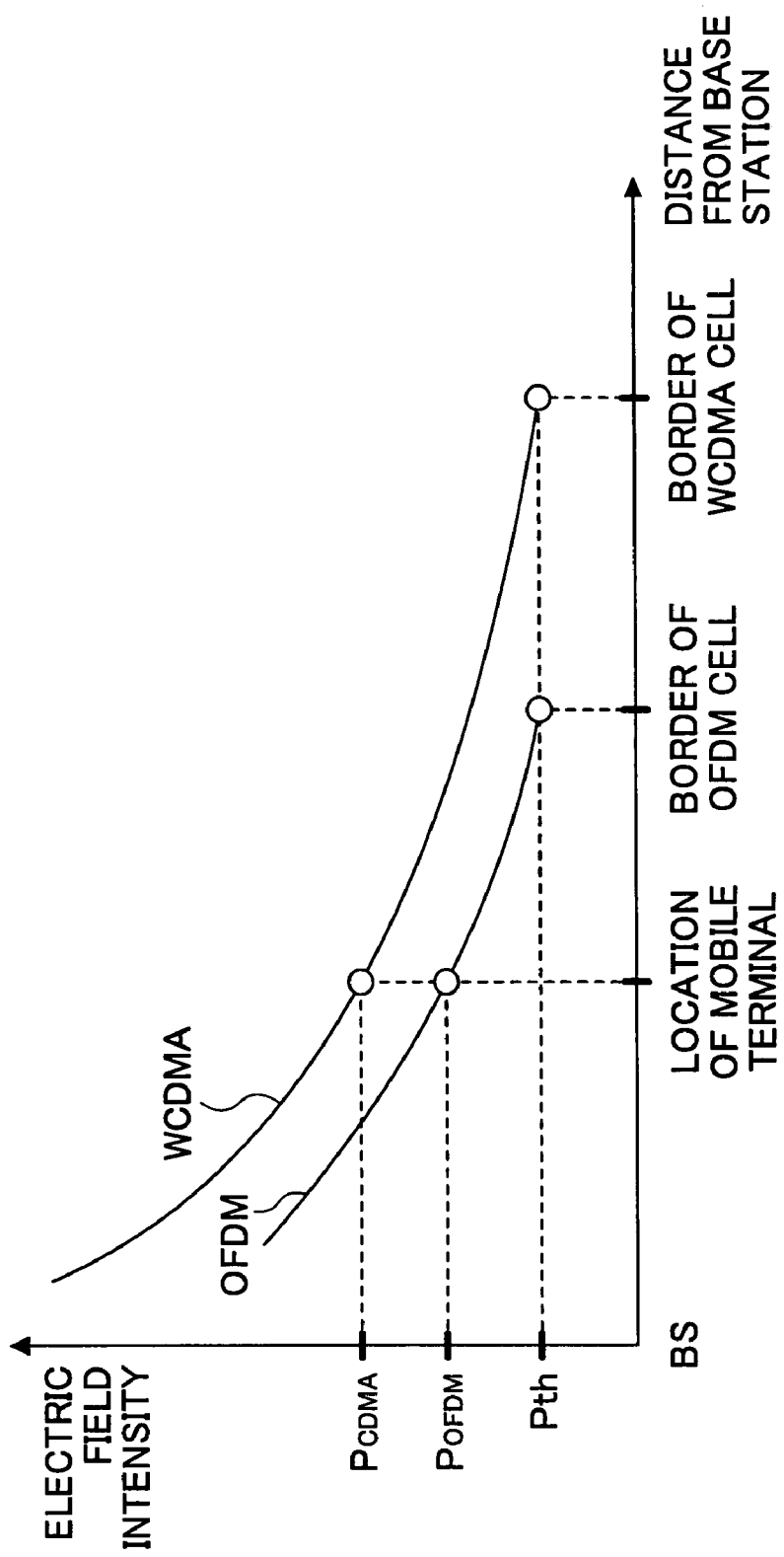
FIG. 1 is a diagram illustrating the relationship between electric field intensity and distance.
Figure 2:
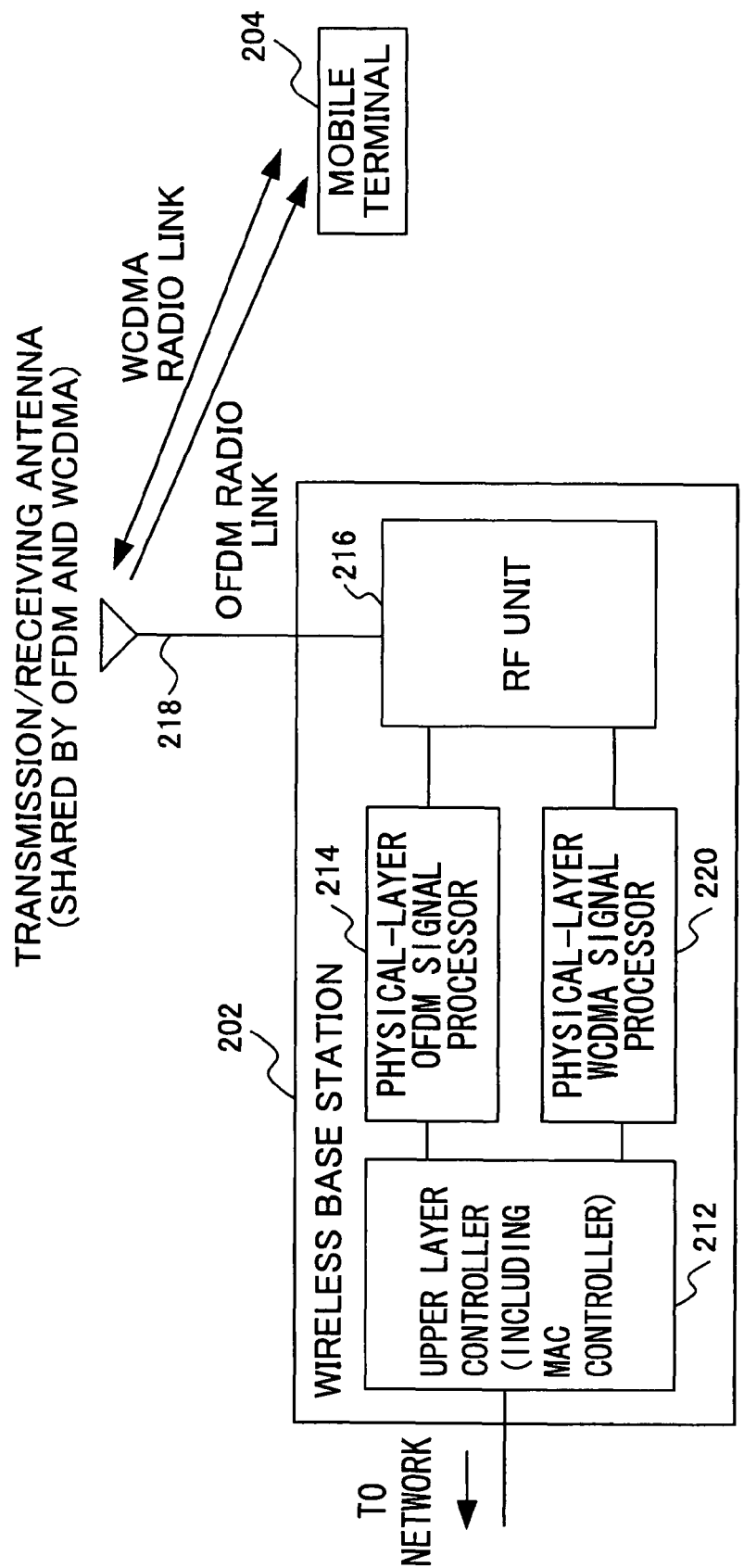
FIG. 2 is a diagram illustrating a wireless base station and a mobile terminal communicating with each other according to an embodiment of the invention.
Figure 3:
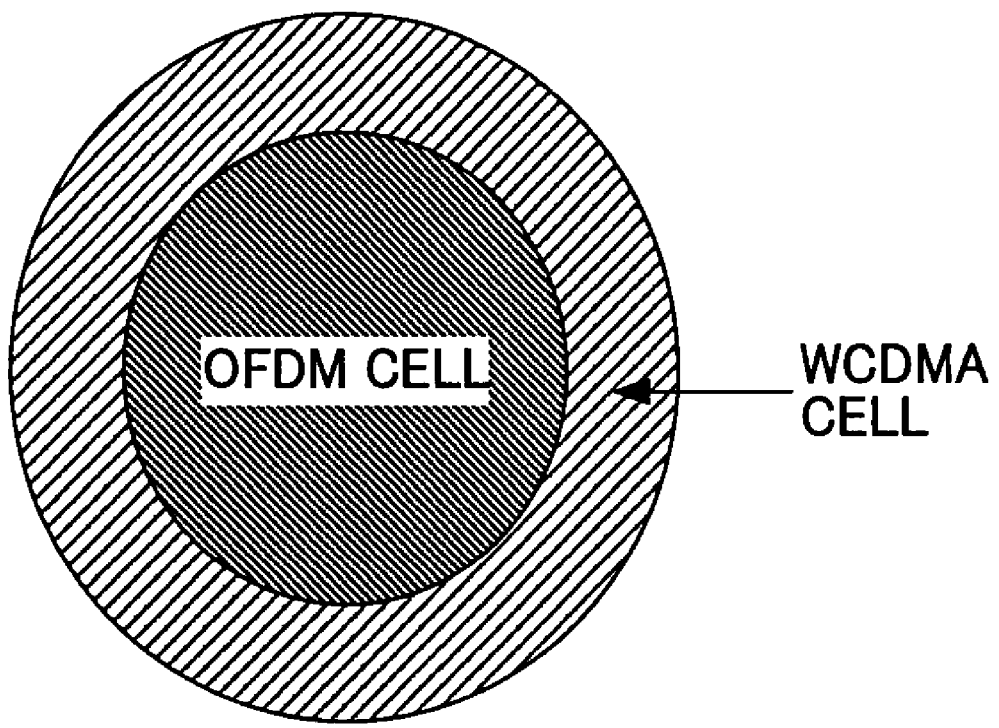
FIG. 3 illustrates an example of coexisting two cells.

FIG. 2 illustrates a wireless base station 202 and a mobile terminal 204 used in an embodiment of the invention. A WCDMA scheme is employed on uplink (which may be referred to as "reverse link"), while a WCDMA scheme and an OFDM scheme are used on downlink (which may be referred to as "forward link"). In other words, a WCDMA radio cell solely exists in uplink communication, but two radio cells coexist in downlink communication, as illustrated in FIG. 3. It is assumed that the cell size is represented by the radium of concentric and that a wireless base station is located at the center of the circles. For the purpose of simplification, the wireless base station transmits and receives radio waves in a concentric manner using an omnidirectional antenna in this embodiment. However, the invention may be applied to a sectored area.

Figure 4:
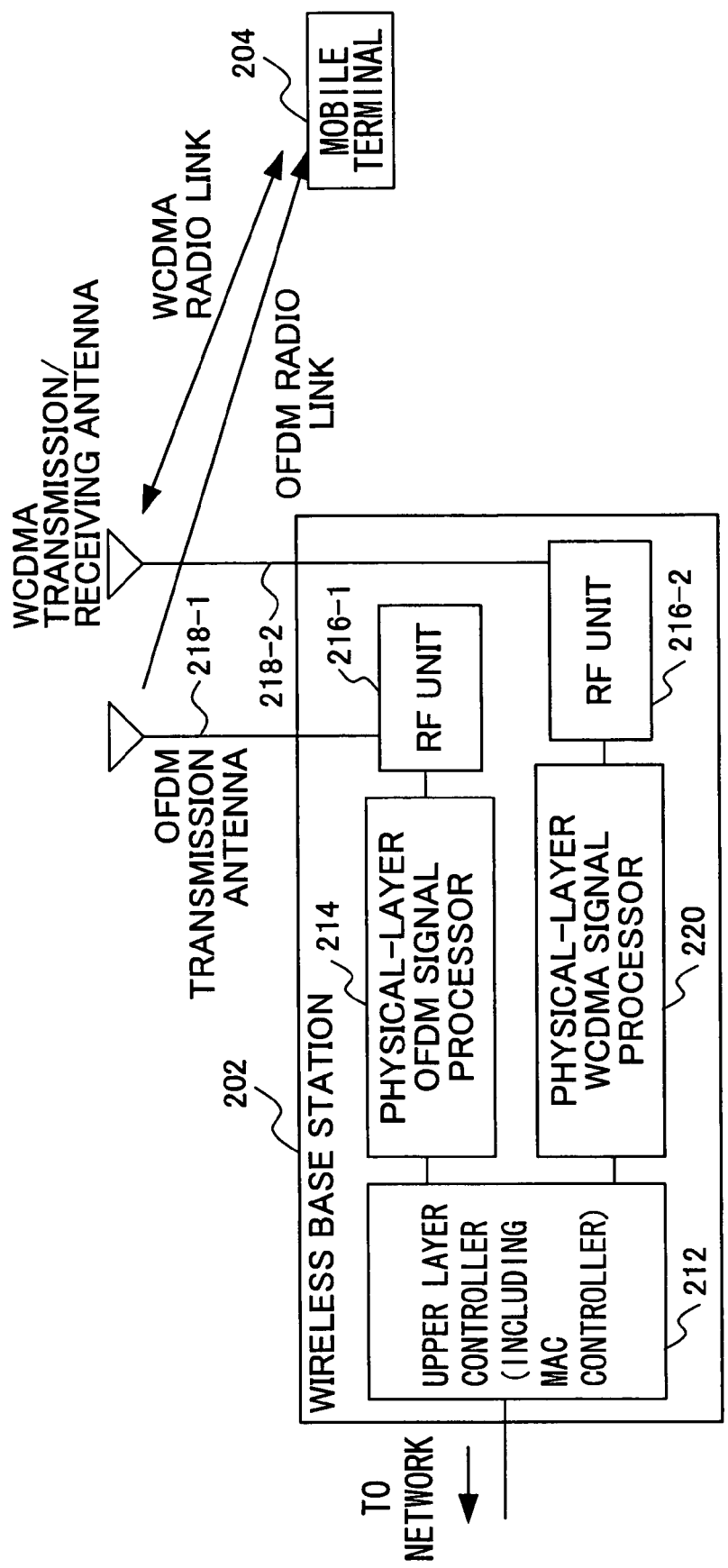
FIG. 4 is a diagram illustrating a wireless base station and a mobile terminal communicating with each other according to another embodiment of the invention.

The wireless base station 202 shown in FIG. 2 has an upper layer controller (including a MAC controller) 212, a signal processor 214 for processing an OFDM signal, an RF unit 216, an antenna 218, and a signal processor 220 for processing a WCDMA signal. The upper layer controller 212 communicates with an upper apparatus (such as a radio network controller. (RNC)) to carry out control for uplink signals and downlink signals. The signal processor 214 processes OFDM signal transmission in the physical layer. The RF unit 216 performs front-end processing on the signals transmitted and received through the antenna 218. The signal processor 220 processes WCDMA signal transmission in the physical layer. Although in this figure the antenna 218 is shared by OFDM signal transmission and WCDMA signal transmission, antennas 218-1 and 218-2 may be provided for the respective cells, as illustrated in FIG. 4.

Figure 5:
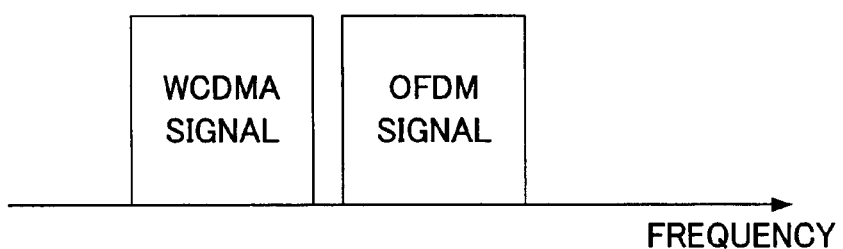
FIG. 5 is a schematic diagram illustrating frequency bands used in the cell-coexisting environment.

The WCDMA signal frequency and the OFDM signal frequency may occupy 5 MHz bands. The frequency bands used in the multi-system coexisting cells are set relatively closer to each other, as illustrated in FIG. 5. This arrangement is not indispensable for the invention; however, it is desired that the signal frequency bands used in the respective systems are close to each other from the viewpoint of sharing the antennas of the wireless base station and/or the mobile terminal between these systems. A narrower or broader frequency band may be used in each of the systems. It is desired to set a broader frequency band for OFDM signal transmission from the viewpoint of making use of the robustness against frequency selective fading or compensating for decrease of the transmission efficiency due to insertion of guard intervals.

Figure 6:
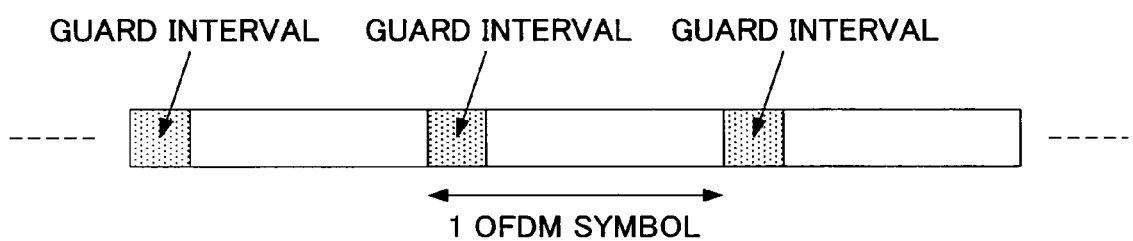
FIG. 6 is a diagram illustrating an OFDM signal.

As illustrated in FIG. 6, an OFDM signal includes a guard interval part. Guard interval is in general a copy of the end portion of the OFDM symbol to which this guard interval is added; however, guard interval may be formed by directly adding the head portion of the OFDM symbol to the end of this symbol.

Figure 7:
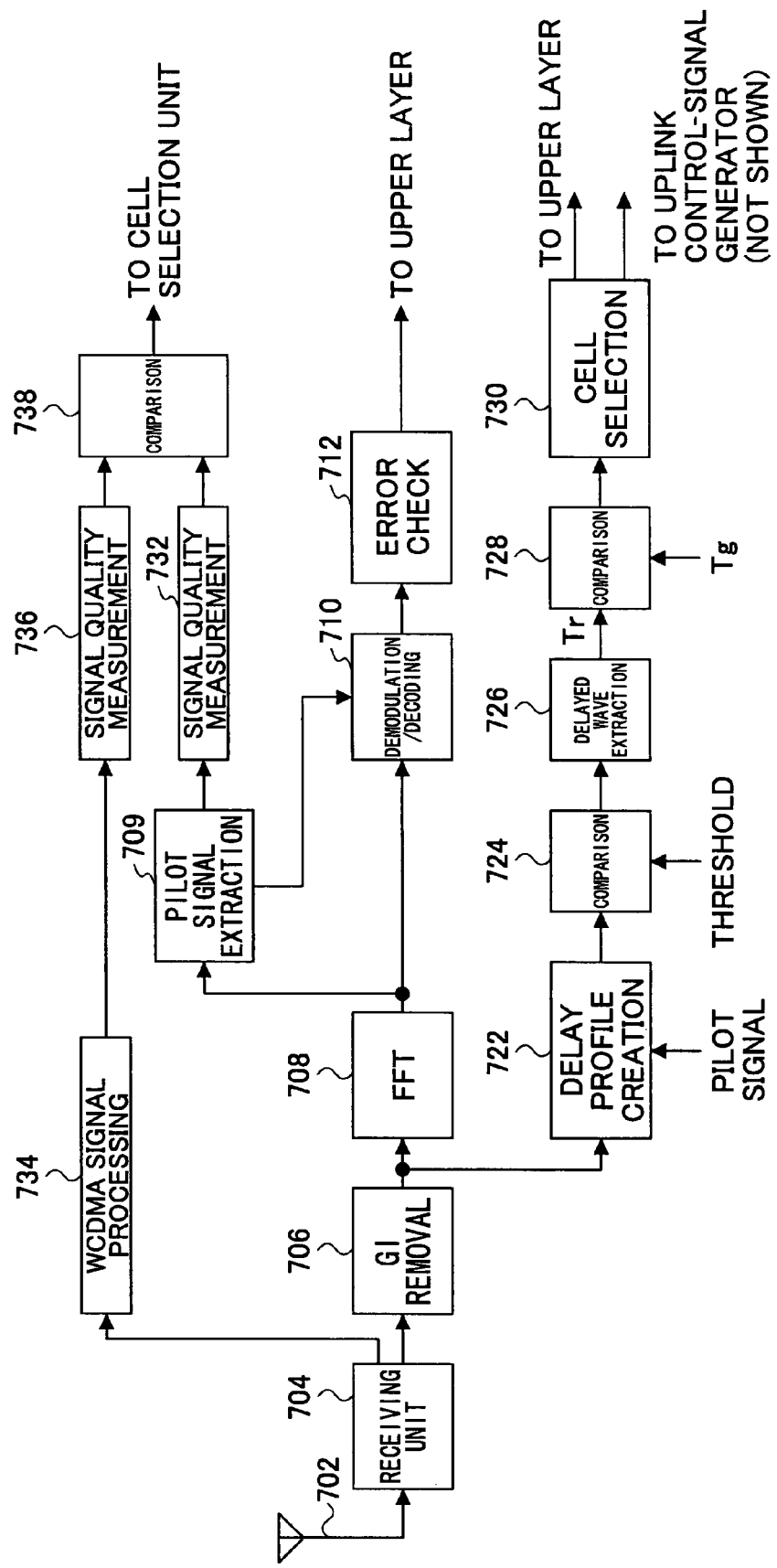
FIG. 7 is a block diagram of a mobile terminal according to an embodiment of the invention.

FIG. 7 is a block diagram of the major part of the mobile terminal according to an embodiment of the invention. In this embodiment, cell selecting operations are carried out at the mobile terminal; however, all or a part of the operations may be performed at other apparatuses (for example, at a wireless base station or a radio network controller). The mobile terminal has an antenna 702, a receiving unit 704, a guard interval (GI) removing unit 706, a fast Fourier transform (FFT) unit 708, a pilot signal extraction unit 709, a demodulation/decoding unit 710, and an error check unit 712. The mobile terminal also has a delay profile creating unit 722, a comparison unit 724, a delay wave extraction unit 726, a comparison unit 728, and a cell selection unit 730. The mobile terminal further has a signal quality measurement unit 732, a WCDMA signal processor 734, a signal quality measurement unit 736, and a comparison unit 738.

The receiving unit 704 performs receiving front-end processes, including band filtering and frequency conversion, on the signal received at the antenna 702. Since in this embodiment an OFDM signal or a WCDMA signal is used on downlink, the receiving unit 704 performs the processes fro each of the frequency bands.

The guard interval (GI) removing unit 706 removes guard intervals from the OFDM signal.

The fast Fourier transform (FFT) unit 708 transforms the input time-domain signal to a frequency-domain signal. To be more precise, serial-to-parallel conversion is performed prior to the fast Fourier transform. The fast Fourier transform unit 708 outputs signal components, each component corresponding to one of the subcarriers, in parallel. As necessary, parallel-to-serial conversion may be performed.

The demodulation/decoding unit 710 demodulates and decodes the transform signal acquired for each of the subcarriers.

The error check unit 712 performs error check on the demodulated and decoded signal using, for example, the CRC code added by the transmission side.

The delay profile creating unit 722 creates a delay profile based on the pilot signal or other suitable signals contained in the received signal from which the guard intervals have been removed. The delay profile may be created by, for instance, calculating the correlation between the pilot signal and the received signal. The delay profile is used to determine the timings and the amplitudes of the multipath arriving waves. The OFDM signal transmitted from a transmission antenna propagates through the space in which obstacles may exist, while being subjected to reflection, diffraction, and penetration, and then reaches the antenna 702 of the receiving side. The arriving radio waves include not only the directly arriving waves, but also delayed waves with longer propagation distances due to repeated reflections. The first-arriving wave is called a primary wave, and the second and subsequent arriving waves are called delayed waves. The primary wave may be a directly arriving wave through line-of-sight propagation without reflection, or may be a non-line-of-sight arriving wave subjected to reflection. In general, not only a signal delayed wave, but also two or more delayed waves are detected. The quantity of delay of each of the delayed waves is represented by time difference between the arrivals of the primary wave and each of the delayed waves.

The comparison unit 724 compares the amplitudes (or the power levels) of the arriving waves with a threshold, which threshold is used to determine whether each of the delayed waves cause degradation of the signal characteristic. The threshold may be determined by, for example, prior experiment or simulation. The threshold may be a fixed value, or it may be varied according to the communication conditions. In the latter case, the threshold level is changed according to the error check result output from the error check unit 712. For example, if an error is detected, the threshold level is reduced, and if not, the threshold may be maintained without change or changed to a greater value.

The delayed wave extraction unit 726 outputs the delay quantity Tr of the most delayed wave among those delayed waves with amplitudes or power levels exceeding the threshold. The delay quantity Tr may be referred to as the "maximum delay quantity".

The comparison unit 728 compares the maximum delay quantity Tr with the guard interval Tg.

The cell selection unit 730 determined, based on the comparison result, which of the WCDMA cell and the OFDM cell is to be selected for radio access from the mobile terminal. The determination result is supplied to an upper layer, as well as to an uplink control signal generator (not shown) of the transmission end in order to report it to the wireless base station.

The signal having been subjected to the fast Fourier transform is also supplied to the pilot signal extraction unit 709, in which the pilot signal is extracted from the supplied signal. The extracted pilot signal is supplied to the signal quality measuring unit 732 to estimates the quality of the received signal. The signal quality is expressed as a ratio of the power level of the desired wave to that of the undesired wave (the interfering wave or the noise signal).

The signal processor 734 performs signal processing on a received WCDMA signal.

The signal quality measuring unit 736 measures the signal quality of the WCDMA signal. The signal quality may be expressed as a ratio of the power level of the desired wave to that of the undesired wave, as in the signal quality measuring unit 732.

The comparison unit 738 compares the signal qualities of the OFDM signal and the WCDMA signal, and supplies the comparison result to the cell selection unit 730.

Figure 8:
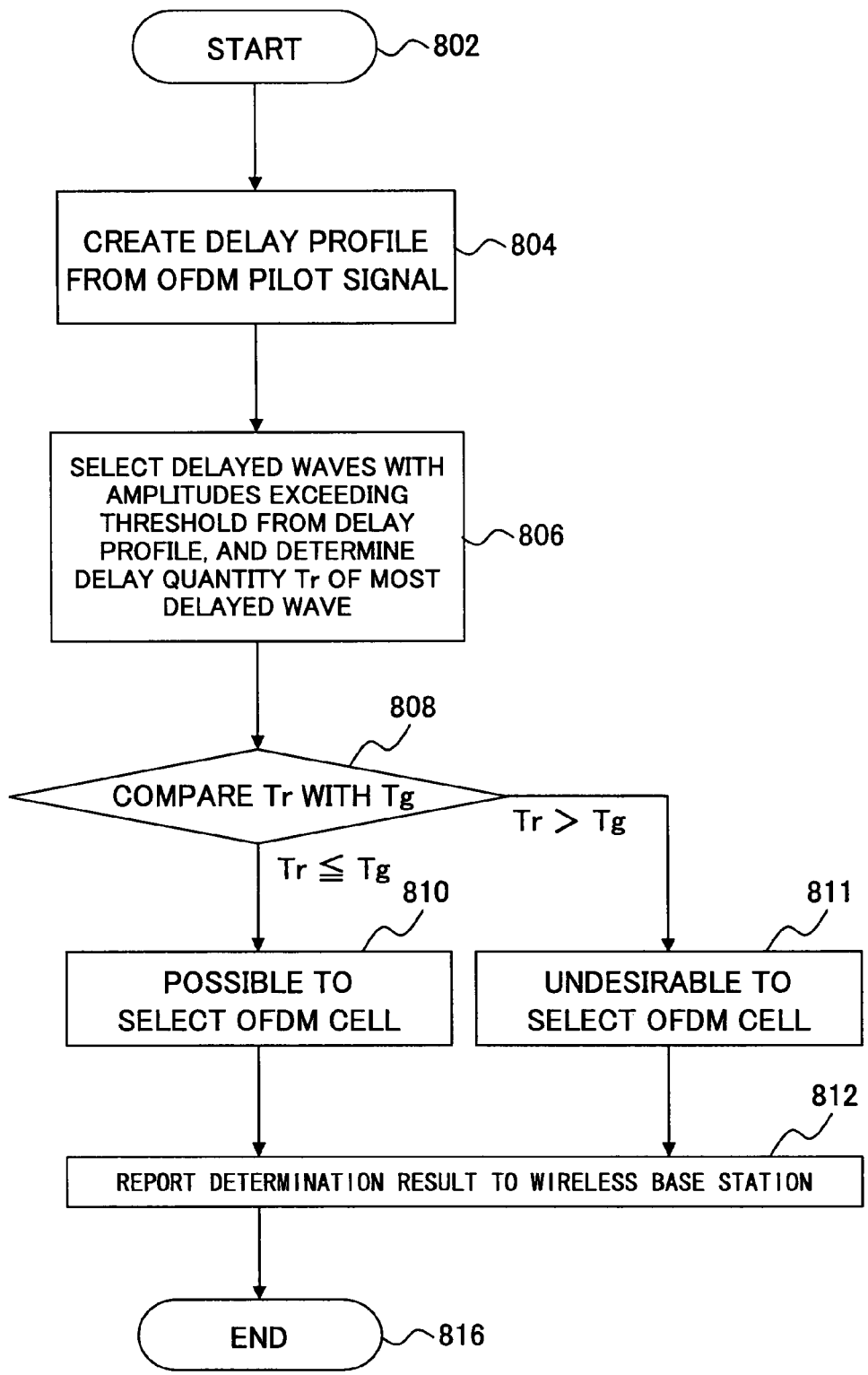
FIG. 8 is a flowchart of a cell selection method according to an embodiment of the invention.

Now, explanation is made of a cell selection method according to an embodiment in conjunction with FIG. 8 and FIG. 7. The components illustrated in FIG. 7 are denoted by numerical symbols starting from digit "7", and the steps illustrated in FIG. 8 are denoted by numerical symbols starting from digit "8". The operation flow of this embodiment is mainly performed at the mobile terminal. (On other embodiments, all or a part of the cell selecting operations are performed at the wireless base station or other nodes.) The flow starts in step 802 of FIG. 8. First, the OFDM signal is received at antenna 702. A pilot signal is contained in the received OFDM signal. Pilot signal may be called a known signal, a reference signal, or a training signal. The pilot signal is transmitted from the wireless base station (not shown) at a constant power level, and the content of the pilot signal is known on both the transmission side and the receiving side. The OFDM signal that contains the pilot signal is input to the guard interval removing unit 706 from the antenna 702 via the receiving unit 704, and the guard interval is removed from the OFDM signal. The guard-interval-removed signal is successively subjected to fast Fourier transform at the FFT unit 708, demodulation and decoding at the demodulation and decoding unit 710, and error check at the error check unit 712.

Figure 9:
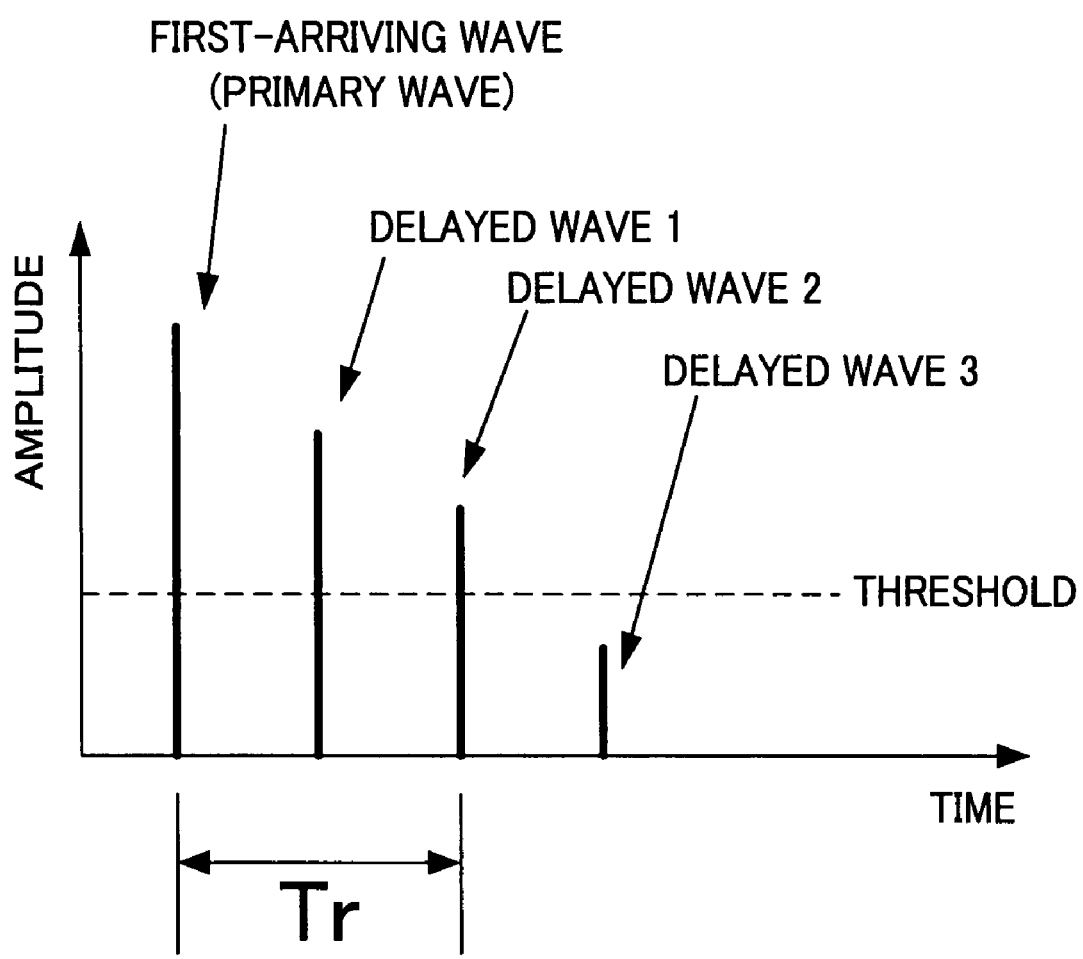
FIG. 9 is a diagram schematically illustrating a delay profile.

In step 804, a delay profile is created by the delay profile creating unit 722. As has been described, the arriving waves include a primary wave and the delayed waves. An example of the delay profile shown in FIG. 9 includes four arriving waves, i.e., a primary wave and three delayed waves 1, 2 and 3 with certain time delays with respect to the primary wave.

In step 806, the most delayed wave is selected among those delayed waves with amplitudes or power levels exceeding the threshold, and the delay quantity Tr of the selected delayed wave is determined. This step is performed by the comparison unit 724 and the delayed wave extraction unit 726. Using the example shown in FIG. 9, the amplitudes of the delayed waves 1, 2 and 3 are compared with the threshold at the comparison unit 724, and the delayed waves 1 and 2 with the amplitudes above the threshold are selected. Since the amplitude of delayed wave 3 is below the threshold, it is not selected. The time delay of the delayed wave 2 with respect to the primary wave is determined as the maximum delay quantity Tr, and output from the delayed wave extraction unit 726. In this embodiment, each of the delayed waves is compared with the threshold to discard less influencing delayed waves because those delayed waves with amplitudes below the threshold do not greatly affect the degradation of the received signal characteristic even if the time delays are large.

In step 808, the maximum delay quantity Tr is compared with the guard interval Tg at the comparison unit 728. If the maximum delay quantity Tr is less than the guard interval, then the process proceeds to step 810.

In this case, the mobile terminal selects the OFDM cell to receive signals in a manner that can effectively reduce the multipath interference because the maximum delay quantity Tr is within the guard interval Tg. This determination is made by the cell selecting unit 730.

If the maximum delay quantity Tr is greater than the guard interval Tg, the process proceeds to step 811. In this case, selecting an OFDM signal is disadvantageous because intersymbol interference becomes large. Accordingly, the ECDMA cell is to be selected. This determination is also made by the cell selecting unit 730.

In step 812, the determination result made by the cell selection unit 730 is reported to the wireless base station, and the process terminates in step 816. If the cell selection is made by the wireless base station or an upper apparatus, the selection result is supplied to the mobile terminal.

Figure 10:
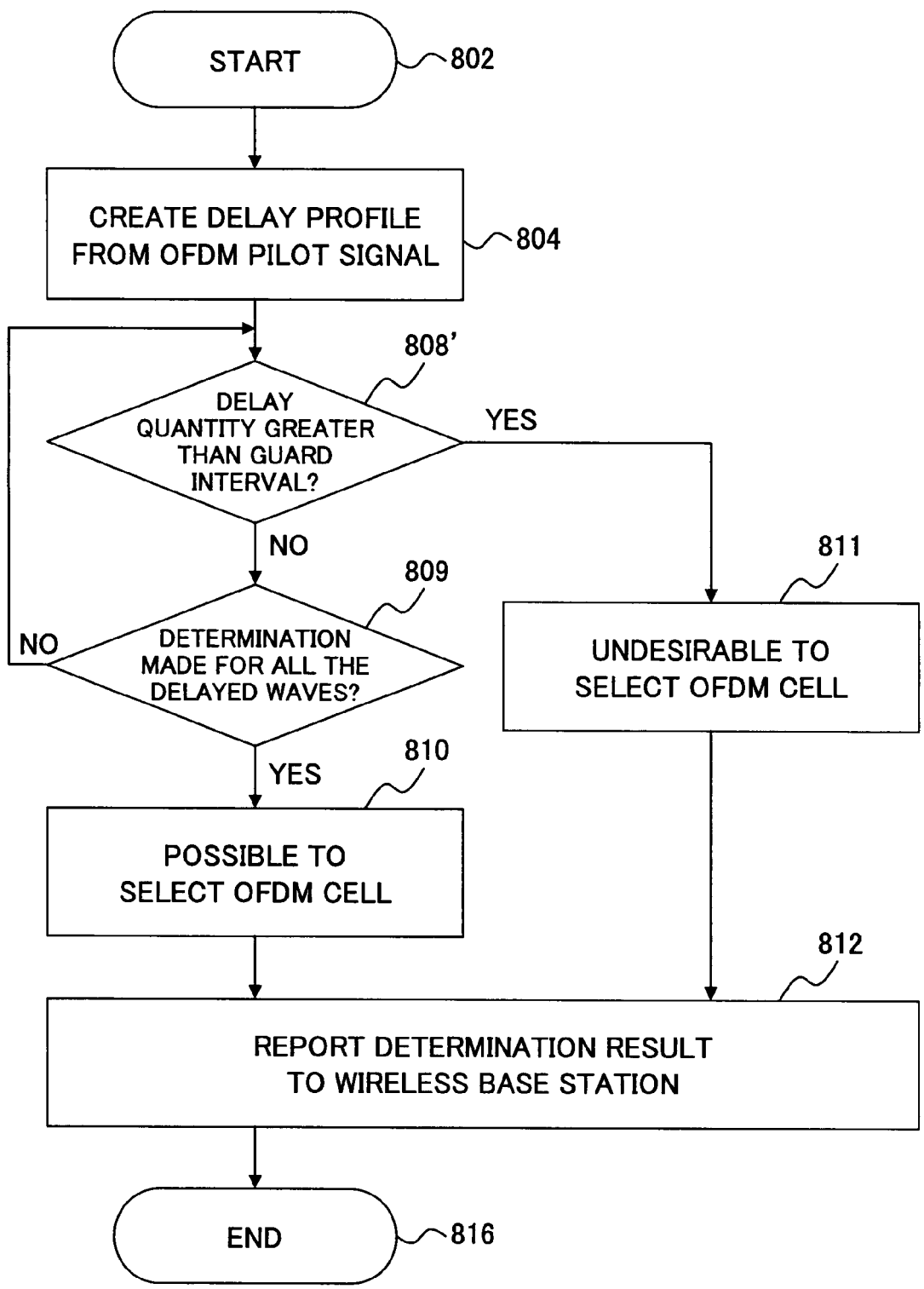
FIG. 10 is a flowchart of a cell selection method according to another embodiment of the invention.

Although it is illustrated in the above-described embodiment that step 808 is performed after step 806, the order may be reversed. In this case, the delayed waves whose time delays exceed the guard interval are selected first. If there is no such delayed waves, the OFDM cell is selected, and if there is any, the WCDMA cell is selected. This alternative method is illustrated in FIG. 10, in which the delay quantity of a delayed wave is compared with the guard interval Tg in step 808'. If a delayed wave with delay quantity greater than guard interval Tg is detected, the process proceeds to step 811, and the WCDMA cell is selected through the above-described determination. Only when the delay quantities of all the delayed waves are within the guard interval in steps 808' and 809, the process proceeds to step 810, and the ORDM cell is elected by the above-described determination.

Because the power level of the arriving wave may take a higher or a lower value instantaneously, the average of multiple measurements may be used in some components, such as the delay profile measuring unit 722. Alternatively, actual cell selection may be carried out after the cell selecting determinations of steps 810 and 811 are performed more than a prescribed number of times because it is preferable to change the cell only when cell change is actually necessary from the viewpoint of stable operations.

Embodiment 2

Figure 11:
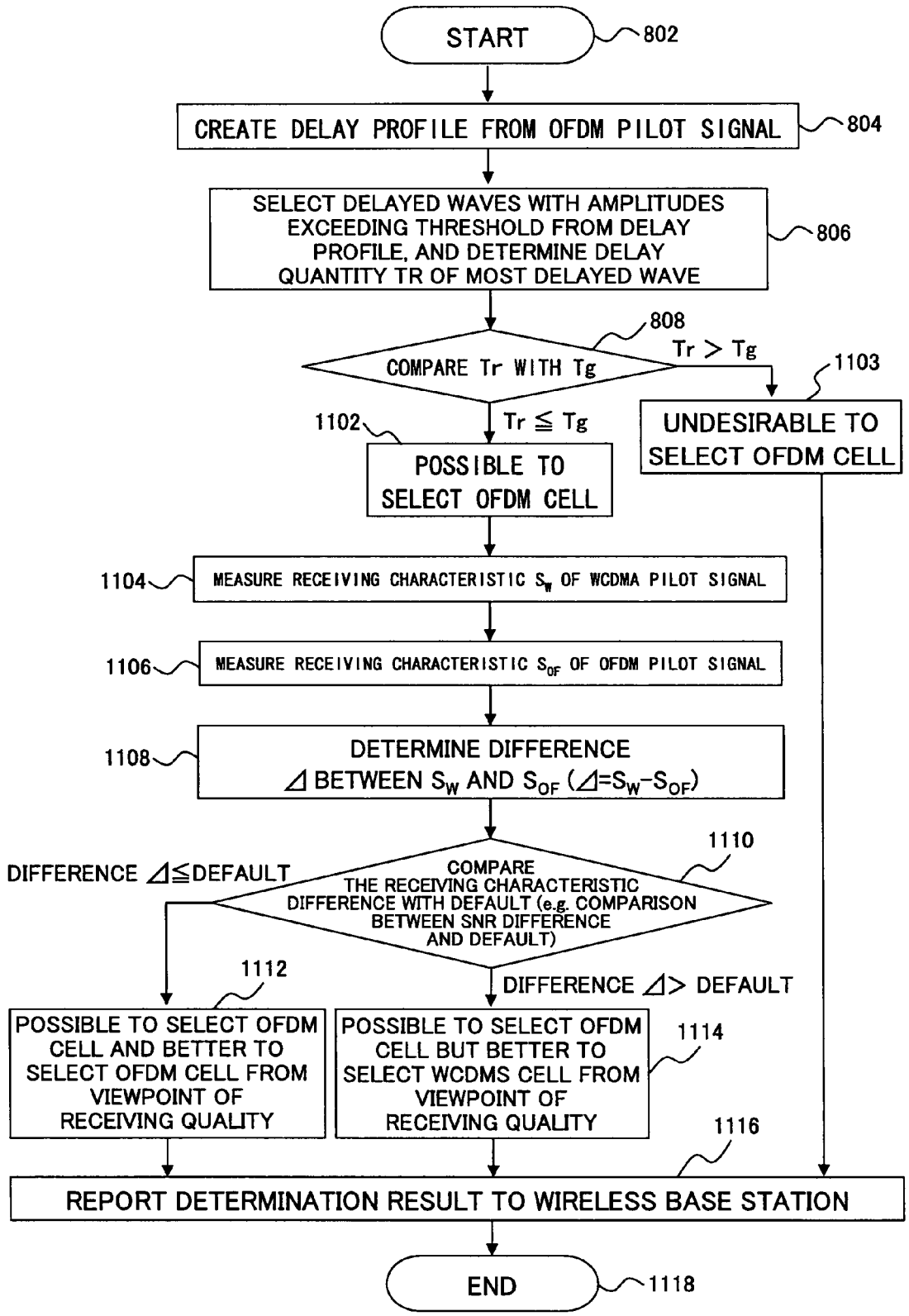
FIG. 11 is a flowchart of a cell selection method according to still another embodiment of the invention.

FIG. 11 is a flowchart of a cell selection method according to an embodiment of the invention. The flow starts in step 802. First, the OFDM signal containing a pilot signal is received at antenna 702. The received OFDM signal is input to the guard interval removing unit 706 via the receiving unit 704, and the guard interval is removed from the OFDM signal. The guard-interval-removed signal is successively subjected to fast Fourier transform at the FFT unit 708, demodulation and decoding at the demodulation and decoding unit 710, and error check at the error check unit 712.

In step 804, a delay profile is created by the delay profile creating unit 722.

In step 806, the most delayed wave is selected among those delayed waves with amplitudes or power levels exceeding the threshold, and the delay quantity Tr of the selected delayed wave is determined. This step is performed by the comparison unit 724 and the delayed wave extraction unit 726 to identify the delayed wave with the maximum delay quantity Tr.

In step 808, the maximum delay quantity Tr is compared with the guard interval Tg at the comparison unit 728. If the maximum delay quantity Tr is less than the guard interval, then the process proceeds to step 1102.

Because in this case the maximum delay quantity Tr is less than the guard interval Tg, the mobile terminal can select the OFDM cell. However, there may be a possible situation where selecting the WCDMA radio cell is better, depending on the received signal quality. Accordingly, in this embodiment, the received signal quality is also considered as a determination criterion for cell selection, in addition to the multipath delay quantities.

In step 1104, the signal quality ($S_W$) of the received WCDMA signal is measured, which measurement is performed by, for example, the signal processor 734 and the signal quality measuring unit 736 shown in FIG. 7. The received signal quality $S_W$ may be determined based on the receiving conditions of the pilot signal contained in the received signal by obtaining the ratio of the power level of the desired wave to that of the undesired wave.

In step 1106, the signal quality ($S_{OF}$) of the received OFDM signal is measured, which measurement is performed by, for example, the signal quality measuring unit 732 shown in FIG. 7. The received signal quality $S_{OF}$ may be determined based on the receiving conditions of the pilot signal contained in the received signal by obtaining the ratio of the power level of the desired wave to that of the undesired wave. Although in the flow shown in FIG. 11, step 1106 is performed after step 1104, the order may be reversed, or all or a part of these steps may be performed simultaneously.

In step 1108, the signal quality difference $\Delta = S_W - S_{OF}$ is calculated.

In step 1110, it is determined whether the difference $\Delta$ is less than or equal to a prescribed value. If the difference $\Delta$ is at or below the prescribed value, the process proceeds to step 1112. The comparison for the signal quality difference is performed at the comparison unit 738, and the comparison result is supplied to the cell selection unit 730.

The process reaching step 1112 means that the maximum delay quantity Tr of the multipath arriving waves is within the guard interval, and that the OFDM signal quality is satisfactory. In this case, it is better for the mobile terminal to perform radio communication in the OFDM cell. Therefore, the cell selection unit 730 selects the OFDM cell. Then the process proceeds to step 1116.

If the signal quality difference $\Delta$ is greater than the prescribed value, the process proceeds to step 1114. In this case, the maximum delay quantity Tr of the multipath arriving waves is within the guard interval Tg; however, the WCDMA signal quality is better than the OFDM signal quality. Accordingly, determination for selecting the WCDMA cell is made by the cell selection unit 730. Then, the process proceeds to step 1116.

If the maximum delay quantity Tr of the multipath arriving waves is greater than the guard interval Tg in the determination of step 808, the process proceeds to step 1103. In this case, it is determined by the cell selection unit 730 that the WCDMA cell is to be selected. Then, the process proceeds to step 1116.

In step 1116, the determination result made by the cell selection unit 730 is reported to the wireless base station, and process terminates in step 1118. It should be noted that if the cell selection is performed by the wireless station or an upper apparatus, then the determination result is reported to the mobile terminal.

With this arrangement, an appropriate cell is selected taking the signal quality, as well as the delay quantities of the multipath arriving wave, into account. This arrangement can avoid to erroneously select the inner cell in spite of the fact that the mobile terminal is located outside the inner cell.

As in the previous embodiment, the comparison step between the maximum delay quantity and the guard interval may be performed after the delay profile has been created in this embodiment.

Embodiment 3

Figure 12:
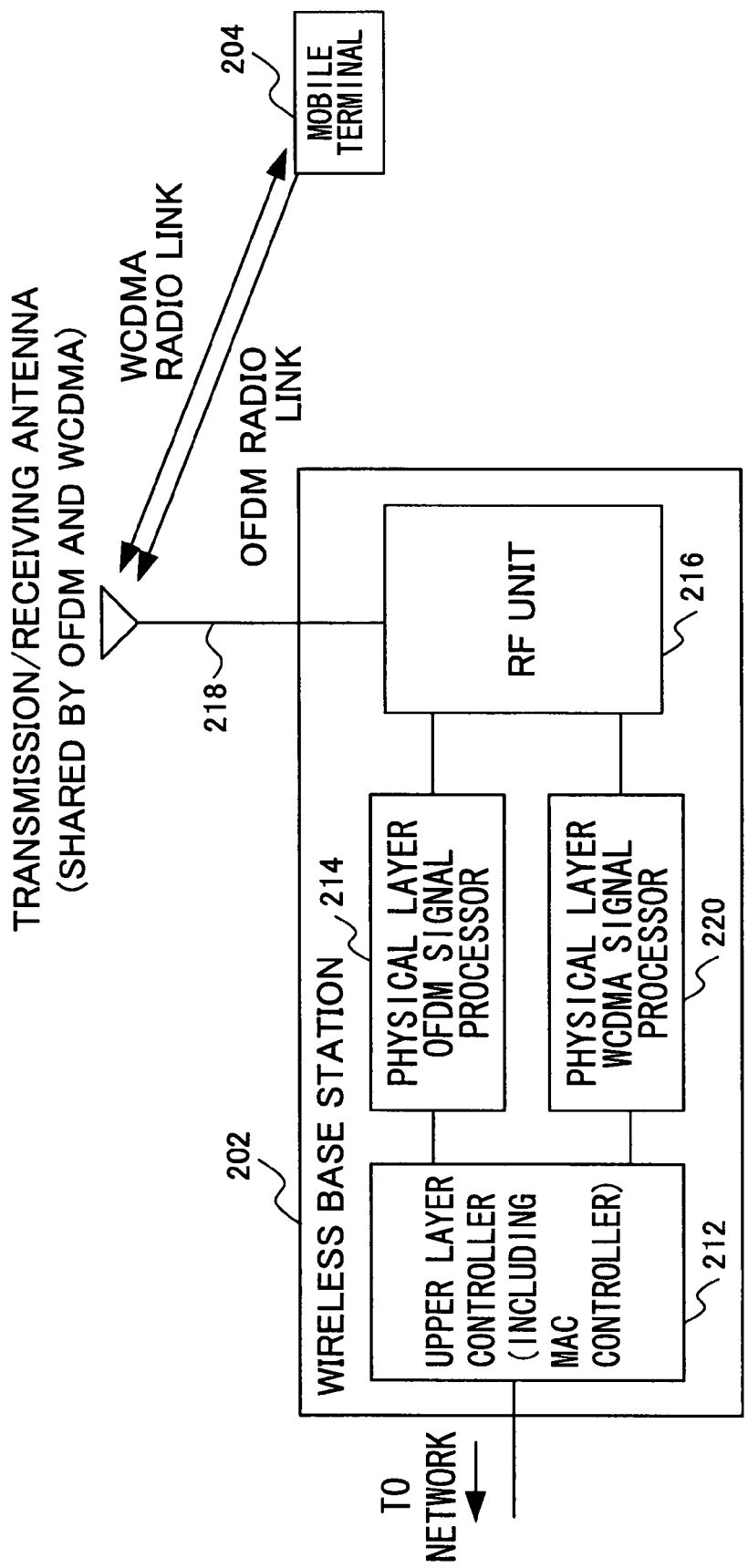
FIG. 12 is a diagram illustrating a wireless base station and a mobile terminal communicating with each other according to still another embodiment of the invention.
Figure 13:
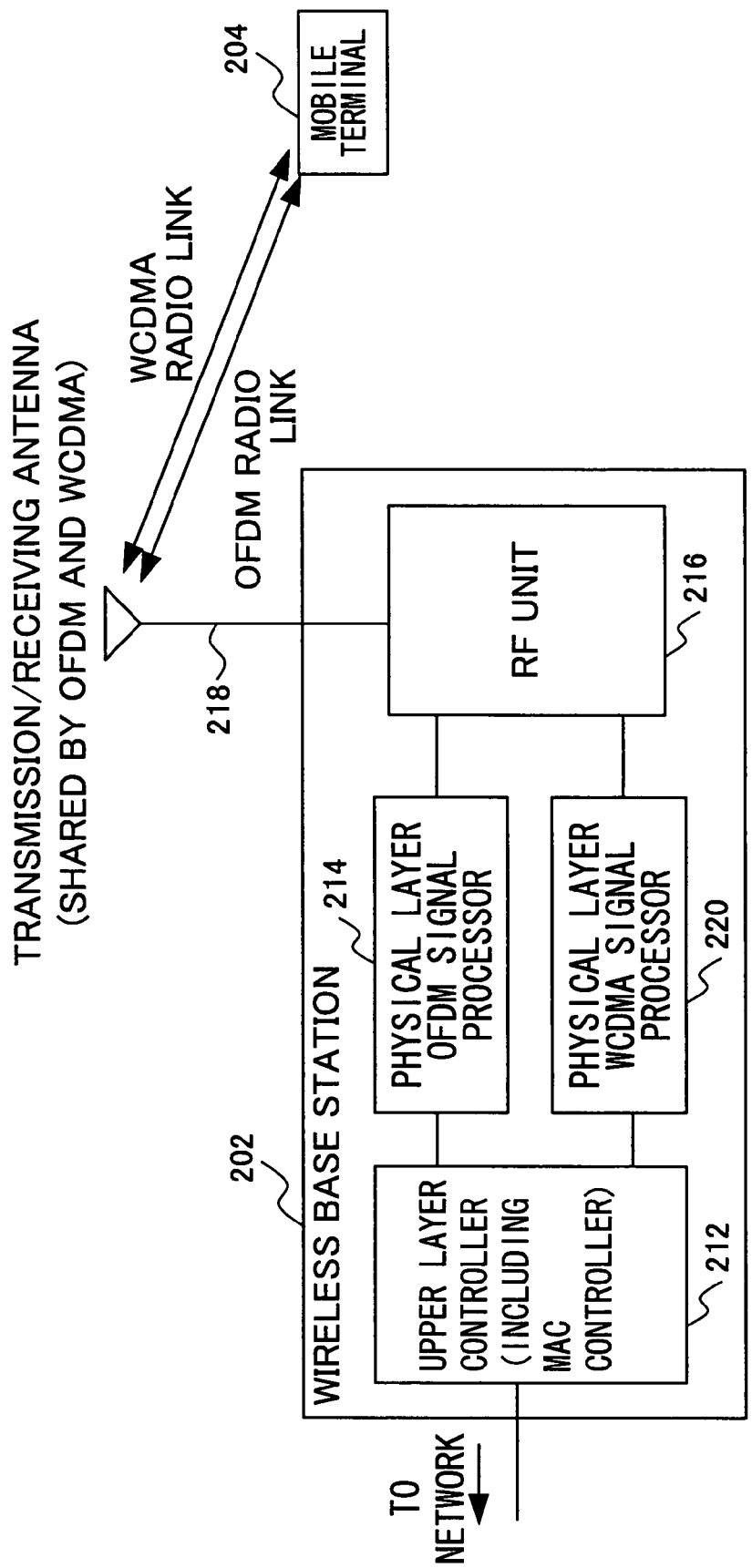
FIG. 13 is a diagram illustrating a wireless base station and a mobile terminal communicating with each other according to yet another embodiment of the invention.

In the above-described embodiments, the WCDMA radio cell is available on the uplink and the downlink, and the OFDM radio cell is further available on the downlink. However, the invention is not limited to this arrangement, and accordingly, in the third embodiment, the OFDM radio cell is available on the uplink, while the WCDMA radio cell is available on both the uplink and the downlink, as illustrated in FIG. 12. In this embodiment, the components used for cell selection are provided in the block 214 of the wireless base station 202. An OFDM pilot signal may be transmitted from the mobile terminal, and the process shown in FIG. 8 may be performed at the wireless base station. In this case, the cell selection result is reported from the wireless base station to the mobile terminal. Alternatively, the WCDMA cell and the OFDM cell may be set available on both the uplink and the downlink, as illustrated in FIG. 13. However, a demand for increasing the throughput to improve the transmission rate is higher on the downlink than on the uplink. From this point of view, it is advantageous to set multiple cells on the downlink, as explained in Embodiment 1. The OFDM cell may be provided either one or both of the uplink and the downlink.

Although in the above-described embodiments the WCDMA-cell/OFDM-cell coexisting environment is assumed, the present invention is not limited to such an example. In place of the OFDM cell, a cyclic prefix CDMA (CP-CDMA) cell may be provided. In this case, the above-described cell selection can be suitably implemented in the WCDMA-cell/CP-CDMA-cell coexisting environment.

Figure 14:
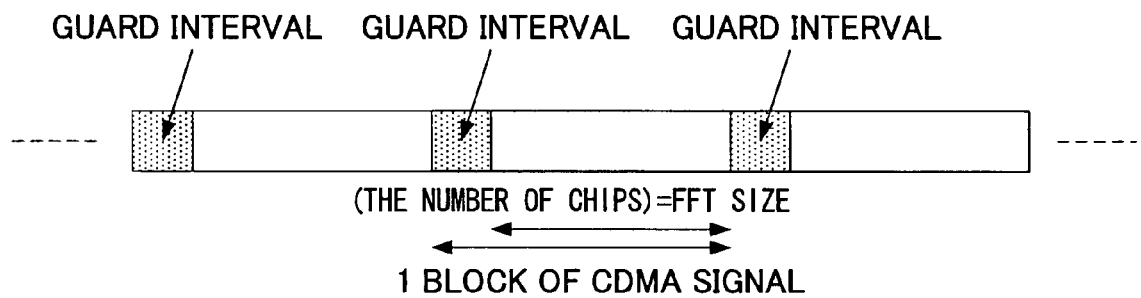
FIG. 14 illustrates a CDMA signal containing guard intervals.

As illustrated in FIG. 14, with a CP-CDMA scheme, guard intervals are inserted in a single-carrier CDMA signal when transmitted from a transmitter. The content of the guard interval is acquired by copying a part of the symbol to be transmitted. On the receiving side, the guard intervals are removed, and fast Fourier transform is performed to convert the received signal from the time domain to the frequency domain. Then, frequency domain equalization is carried out using weighting signals based on, for example, the minimum mean square error (MMSE) to remove the multipath influence. The equalized signal is then subjected to inverse fast Fourier transform and transformed into equalized time-domain signal. Thus, high-rate signal transmission is realized with sufficient multipath tolerance using a CP-CDMA scheme, while the problem that the peak to average power ratio (PAPR) becomes extremely increases (which problem becomes serious when using multi-carrier signals, such as OFDM signals) can be reduced.

Embodiment 4

Figure 15:
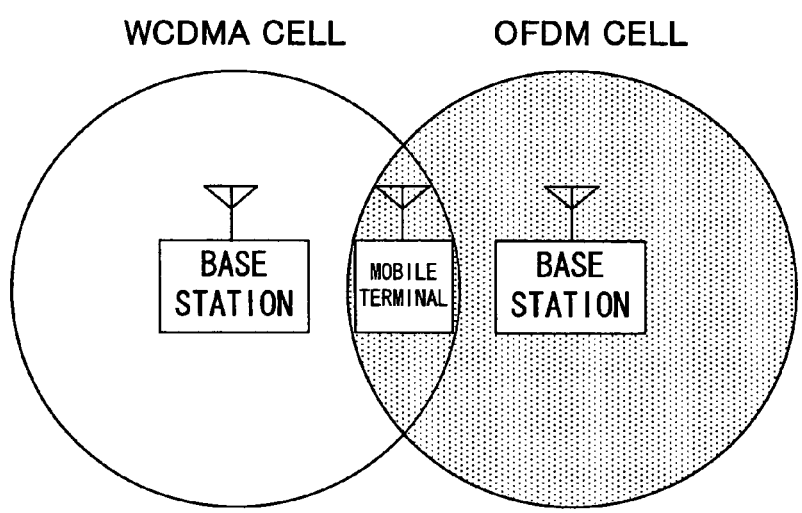
FIG. 15 illustrates another example of coexisting two cells.
Figure 16:
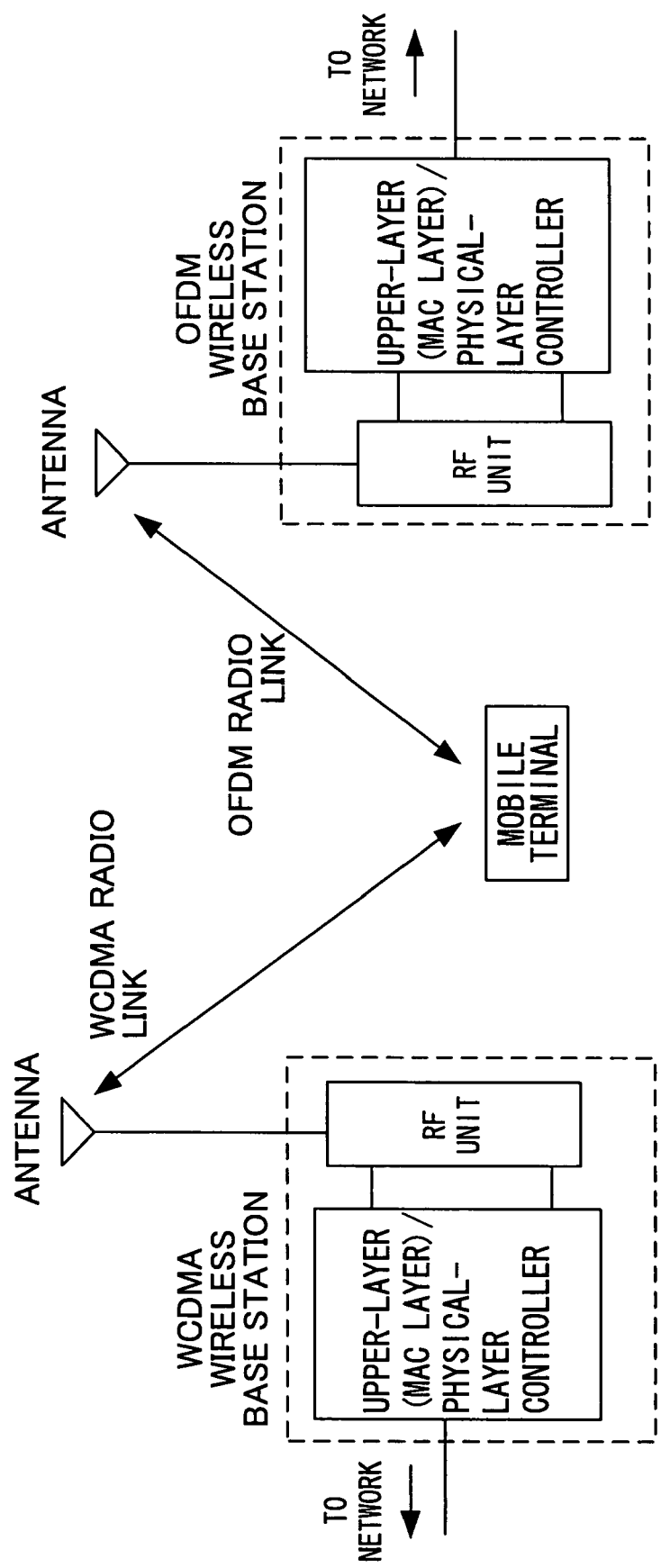
FIG. 16 illustrates an OFDM base station and a WCDMA base station, both of which are connectable to the mobile terminal.

In the above-described embodiment, a cell using guard interval inserted in the transmission signal is included inside a cell that does not use guard interval in the transmission signal; however, the invention is not limited to such an arrangement, and is applicable to other cell layout. For example, the above-described cell selection may be implemented in the environment in which a part of an OFDM cell overlaps a WCDMA cell, as illustrated in FIG. 15. It should be noted that under the cell layout shown in FIG. 15, wireless base stations of the respective schemes are provided independently from each other, as illustrated in FIG. 16.

Embodiment 5

In the above-described embodiment, it is assumed that a cell using guard intervals inserted in the transmission signal and a cell that does not use guard interval in the transmission signal coexist; however, the invention is not limited to such an example. In this embodiment, the coexisting systems use guard intervals in the transmission signals, but the lengths of the guard intervals are different between the systems. Examples of the system that uses guard intervals in the transmission signal include an OFDM system and a CP-CDMA system.

Figure 17:
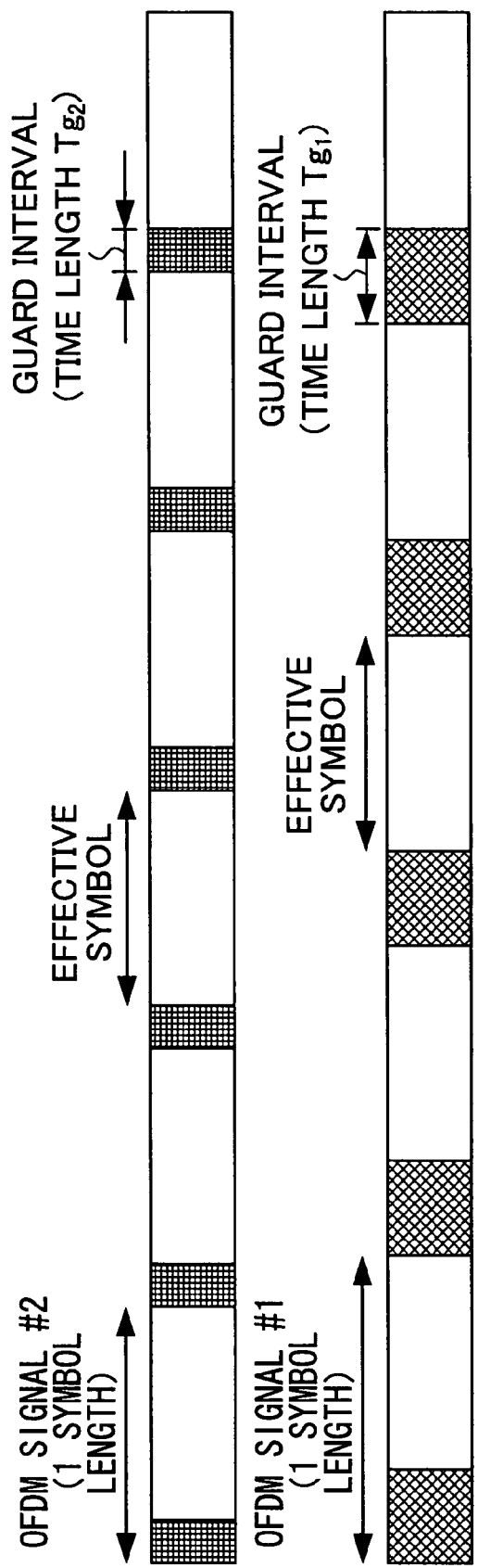
FIG. 17 illustrates two OFDM signals with guard intervals of different lengths.
Figure 18:
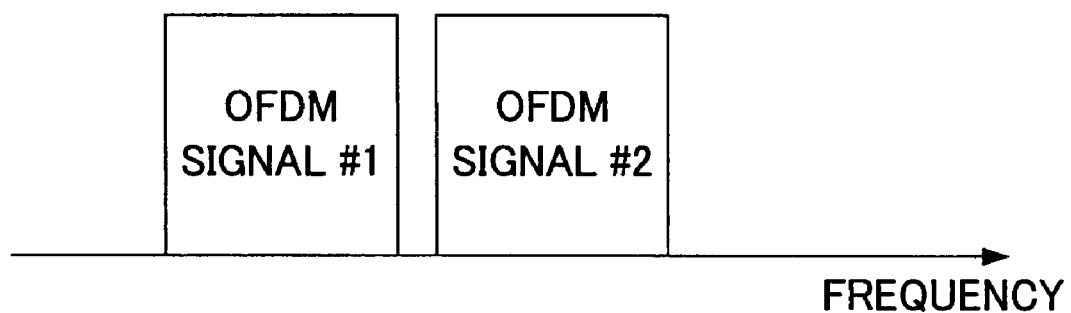
FIG. 18 illustrates frequency bands used in the cell-coexisting environment.
Figure 19:
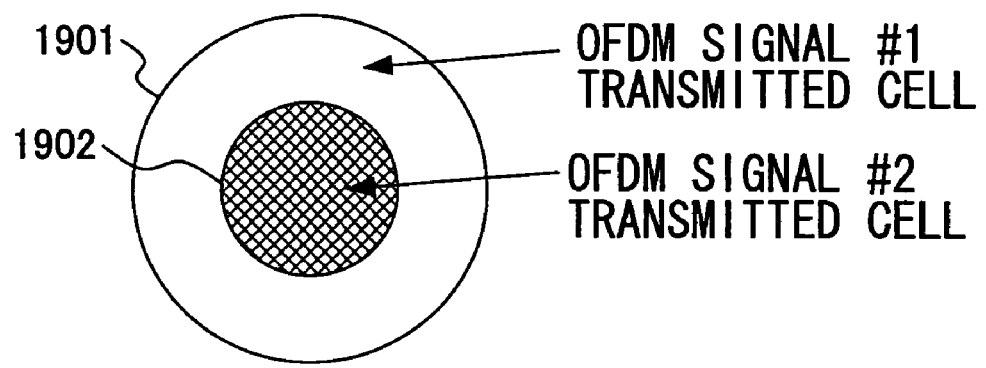
FIG. 19 illustrates still another example of coexisting two cells.

In FIG. 17, the first communication system uses an OFDM signal with guard interval of first length $T_{g1}$ inserted (as illustrated at the bottom), and the second communication system uses an OFDM signal with guard interval of second length $T_{g2}$ inserted (as illustrated at the top). The respective OFDM signals are transmitted using independent frequency bands, as illustrated in FIG. 18 (which figure illustrates only an example, and therefore, the frequency bands allocated to the OFDM signals may be reversed.) The frequency band allocated to the second OFDM cell may be broadened as compared with one allocated to the first OFDM cell. It is assumed in this example that the first guard interval is greater than the second guard interval ($T_{g1} > T_{g2}$). Although not indispensable for the invention, it is desirable that the frequency bands used by the coexisting systems are close to each other from the viewpoint of sharing the antenna of the wireless base station and the antenna of the mobile terminal by the coexisting systems. As the guard interval is set longer, the influence of the multipath delayed waves with large quantity of delay can be reduced more efficiently. Accordingly, the cell layout illustrated in FIG. 19 is desired, in which the second communication system cell 1902 is encompassed by the first communication system cell 1901. Even with this arrangement, the mobile terminal compatible to the two cells preferably selects a cell using a short-guard-interval signal (of the second communication system) as long as the delay quantities of the multipath arriving waves are less than the guard interval $T_{g2}$ in order to carry out radio communication with satisfactory transmission efficiency.

Figure 20:
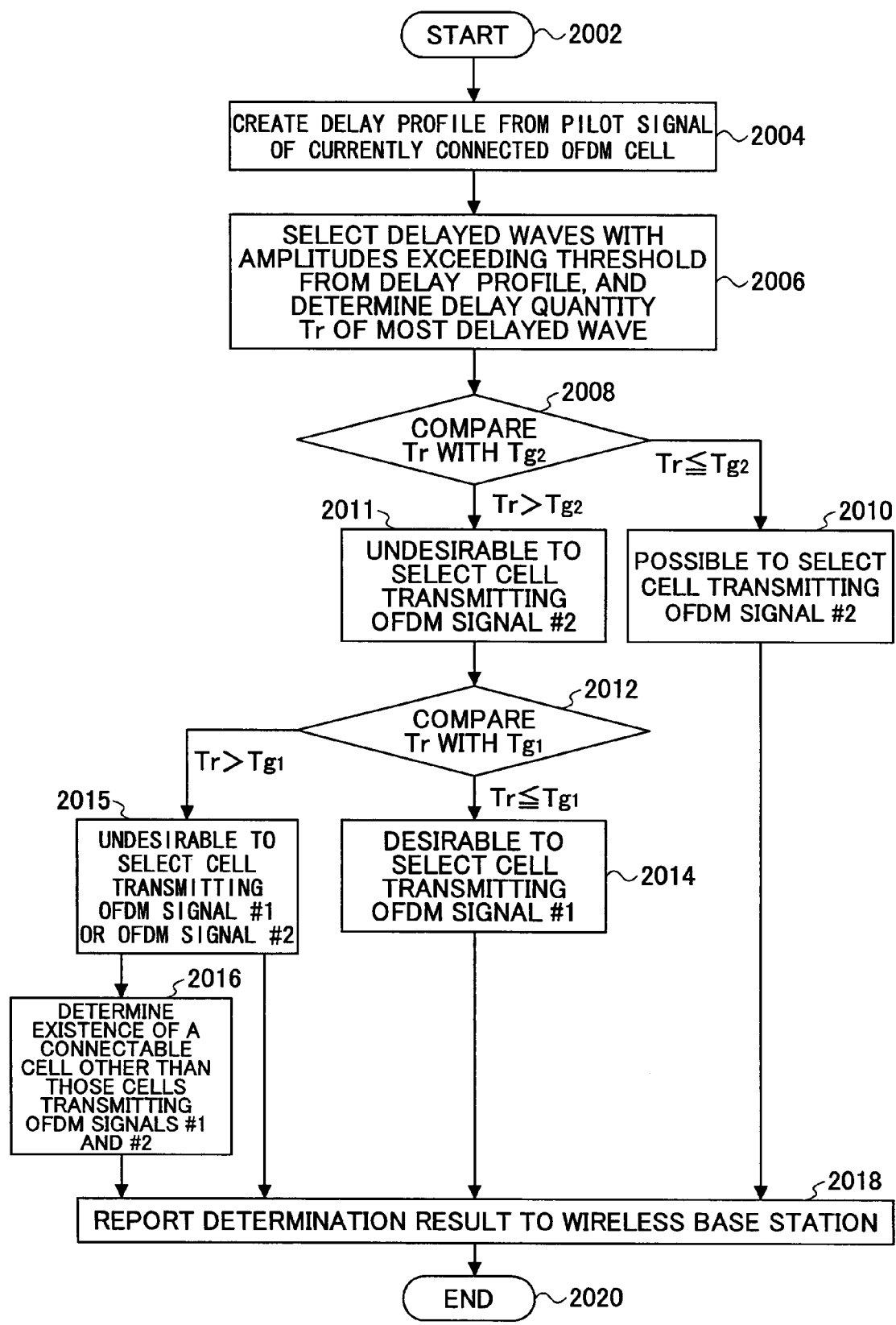
FIG. 20 is a flowchart of a cell selection method according to still another embodiment.

FIG. 20 is a flowchart of cell selection operations according to an embodiment of the invention. The process starts in step 2002 and proceeds to step 2004. It is assumed for sake of explanation that a cell 1901 (of the first communication system) using guard interval $T_{g1}$ is provided on both the uplink and the downlink, and a cell 1902 (of the second communication system) using guard interval $T_{g2}$ is overlaid on the downlink. A pilot signal containing a guard interval $T_{g2}$ is transmitted from the wireless base station to a mobile terminal, and the mobile terminal implements the cell selection illustrated in FIG. 20. Of course, the process may be performed at the wireless based station, as described in Embodiment 3.

In step 2004, a delay profile is created from the received radio signals transmitted from the currently connected cells. In this embodiment, both the first and second communication systems use guard intervals in the transmission signals, pilot signals containing guard intervals are transmitted from both systems.

In step 2006, those delayed waves with amplitudes exceeding a prescribed threshold level are selected from among the multipath arriving waves contained in the delay profile, and the delayed wave with the maximum delay quantity Tr is identified.

In step 2008, the maximum delay quantity Tr is compared with the shorter guard interval $T_{g2}$. If the maximum delay quantity Tr is at or below the guard interval $T_{g2}$, the process proceeds to step 2010.

In step 2010, it is determined that the cell using the shorter guard interval $T_{g2}$ can be selected.

If the maximum delay quantity Tr is greater than the guard interval $T_{g2}$ in step 2008, the process proceeds to step 2011, in which it is determined that selecting the cell using the guard interval $T_{g2}$ is undesirable.

Then, in step 2012, the maximum delay quantity Tr is compared with the longer guard interval $T_{g1}$. If the maximum delay quantity Tr is at or below the guard interval $T_{g1}$, the process proceeds to step 2014.

In step 2014, it is determined that the cell using the longer guard interval $T_{g1}$ can be selected.

If the maximum delay quantity Tr is greater than the guard interval $T_{g1}$ in step 2012, the process proceeds to step 2015, in which it is determined that selecting the cell using the guard interval $T_{g1}$ is undesirable.

Then it is determined in step 2016 whether there is an available cell existing other than cell 1901 and cell 1902. The process reaches this step when the maximum delay quantity Tr of the received signal is greater than either guard intervals, and therefore, it is expected that a great deal of inter symbol interference occurs if the mobile terminal accesses cell 1901 or cell 1902. Since in this case there is a high possibility that the mobile terminal is located in a nearby adjacent to cell 1901 or cell 1902, searching for other available cells is of great significance.

In step 2018, the determination result made in step 2010, 2014, 2015 or 2016 is reported to the wireless base station, and a process for allowing the mobile station to access the appropriately selected cell is carried out as necessary. Then, the process terminates in step 2020. If cell selection is implemented at the wireless base station or an upper apparatus, the cell selection result is reported to the mobile terminal.

Figure 21:
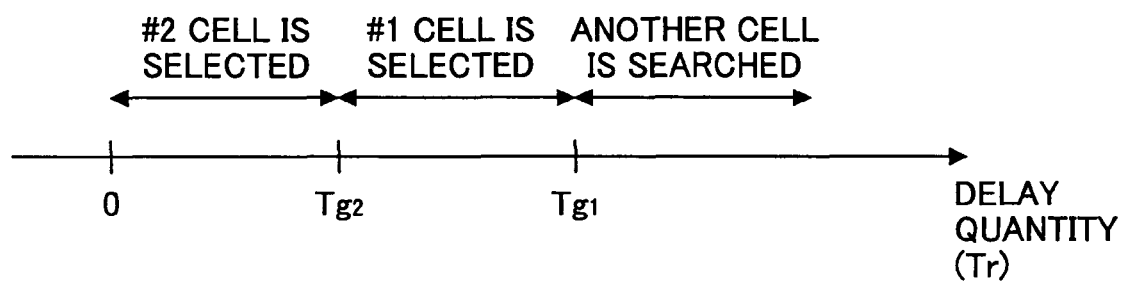
FIG. 21 is a diagram illustrating the relationship between guard interval lengths and cells to be selected.

As illustrated in FIG. 21, according to the invention, if the maximum delay quantity Tr is at or below the shorter guard interval $T_{g2}$, the cell of the second communication system is selected. If the maximum delay quantity Tr is greater than the shorter guard interval $T_{g2}$ and smaller than or equal to the longer guard interval $T_{g1}$, the cell of the first communication system is selected. If the maximum delay quantity Tr is greater than the longer guard interval $T_{g1}$, another cell is searched.

In this embodiment, the maximum delay quantity is first compared with the shorter guard interval $T_{g2}$, and then compared with the longer guard interval $T_{g1}$ for the sake of explanation. However, the comparison order may be reversed, and all or a part of these comparisons may be carried out simultaneously.

In the embodiment, two guard intervals, a longer one and a shorter one, are used in the multi-system coexisting environment for simplification sake. However, the present invention can be applied to the multi-system coexisting environment using three or more guard intervals.

The invention has been explained above based on several embodiments. Each of the embodiments may be solely used or combined with other embodiments. The present invention is not limited to these embodiments, and many modifications and alterations can be made within the scope of the invention.

What is claimed is:

1. A cell selection apparatus used in an area in which multiple communication systems coexist, comprising:
    a delay profile creation unit configured to create a delay profile from a received radio signal and detect amplitudes and timing of multipath arriving waves;
    a comparison unit configured to compare at least one delay quantity of the multipath arriving waves with a guard interval of a signal used in at least one of said multiple communication systems; and
    a determination unit configured to determine a cell provided by one of the communication systems to which a mobile terminal is to be connected based on the comparison result,
    wherein the comparison unit compares said at least one delay quantity with two or more of the guard intervals, each of the guard intervals being used in one of said multiple communication systems, and
    wherein the at least one delay quantity is compared with a first guard interval used in a first cell and with a second guard interval shorter than the first guard interval and used in a second cell entirely encompassed by the first cell.

2. The cell selection apparatus of claim 1, further comprising:
    a measuring unit configured to measure a quality of the received radio signal for each of the multiple communication systems.

3. The cell selection apparatus of claim 1, furnished in the mobile terminal.

4. The cell selection apparatus of claim 1, furnished in a wireless base station communicating with the mobile terminal.

5. The cell selection apparatus of claim 1, wherein the communication system that uses the signal containing the guard interval is an orthogonal frequency division multiplexing (OFDM) system or a code division multiple access (CDMA) system.

6. The cell selection apparatus of claim 1, wherein the cell selection apparatus is used in the coexisting area in which at least one of the communication systems is a code division multiple access (CDMA) communication system.

7. The cell selection apparatus of claim 6, wherein a cell of the CDMA system encompasses the entire area of a cell of the communication system that uses the guard interval.

8. A cell selection method used in an area in which multiple communication systems coexist, comprising:
    creating a delay profile from a received radio signal and detecting amplitudes and timings of multipath arriving waves;
    comparing at least one delay quantity of the multipath arriving waves with a guard interval used in a signal of at least one of said multiple communication systems; and
    determining a communication system from said multiple communication systems that provides a cell to which a mobile terminal is to be connected based on the comparison result,
    wherein the comparing includes comparing said at least one delay quantity with two or more of the guard intervals, each of the guard intervals being used in one of said multiple communication systems, and
    at least one delay quantity is compared with a first guard interval used in a first cell and with a second guard interval shorter than the first guard interval and used in a second cell entirely encompassed by the first cell.

9. The method of claim 8, further comprising:
    measuring a quality of the received radio signal for each of the communication systems before the determination step.

* * * * *